R. HASTINGS.
MUD GUARD.
APPLICATION FILED MAR. 28, 1919.
1,374,917.
Patented Apr. 19, 1921.
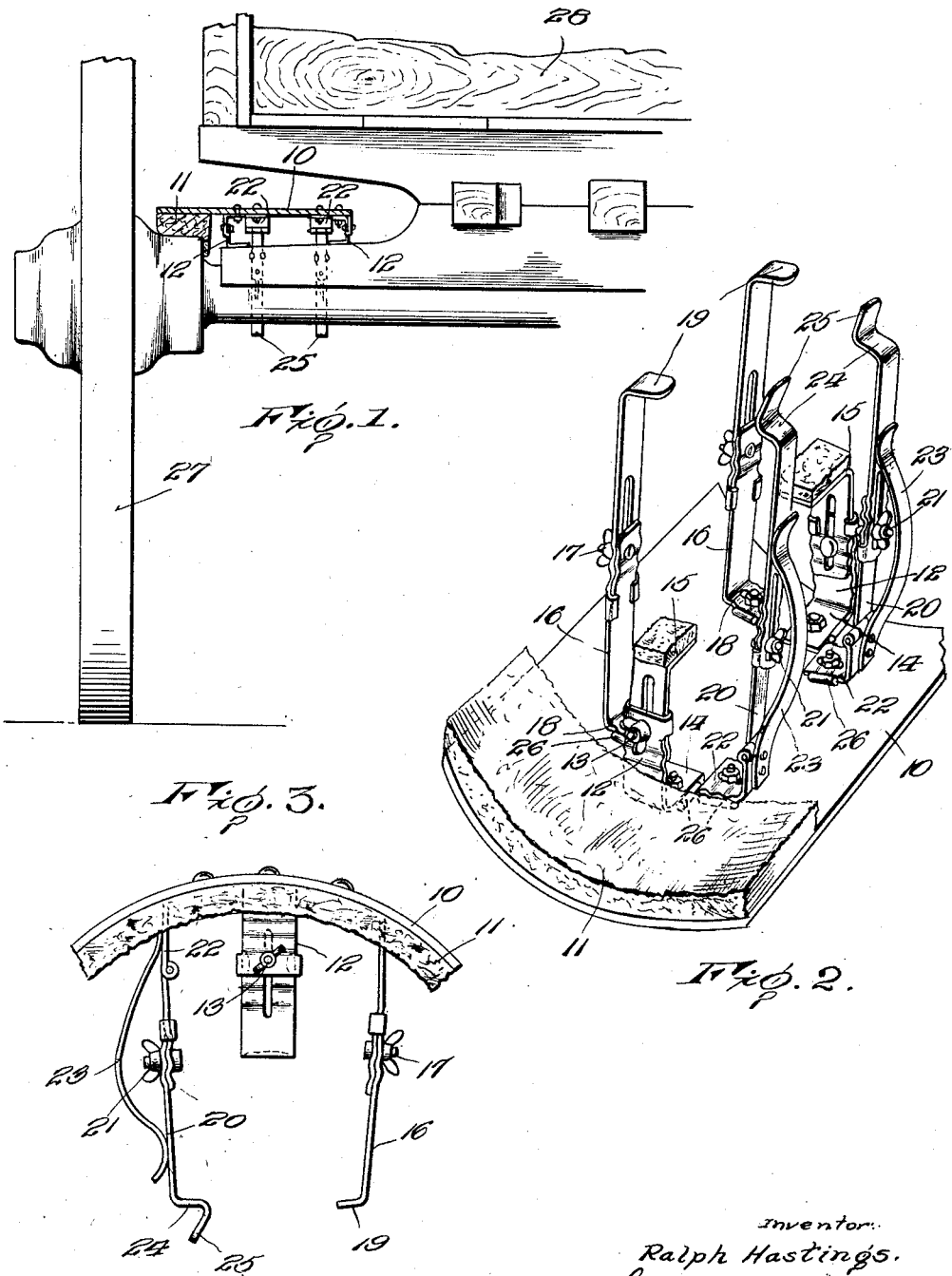
Inventor:
Ralph Hastings.
by Lacey & Lacey,
Attorneys.

UNITED STATES PATENT OFFICE.

RALPH HASTINGS, OF INGRAHAM, ILLINOIS.

MUD-GUARD.

1,374,917.    Specification of Letters Patent.    Patented Apr. 19, 1921.

Application filed March 28, 1919. Serial No. 285,807.

*To all whom it may concern:*

Be it known that I, RALPH HASTINGS, a citizen of the United States, residing at Ingraham, in the county of Clay and State of Illinois, have invented certain new and useful Improvements in Mud-Guards, of which the following is a specification.

This invention relates to an improved mud guard for wagons or the like and has as its primary object to provide a simple and efficient device of this character for preventing mud, sand, or other foreign matter from falling upon the axle at the inner end of the wheel hub.

The invention has as a further object to provide a guard employing adjustable supporting brackets so that the guard may be positioned vertically with respect to the wagon axle and consequently, may also be adjusted for use upon different wagons.

And the invention has as a still further object to provide a guard which will be clamped upon the wagon axle but wherein the guard may, when desired, be readily removed.

Other and incidental objects will appear hereinafter. In the accompanying drawings:

Figure 1 is a fragmentary elevation partly in section showing my improved guard in active position upon a conventional type of wagon, Fig. 2 is a perspective view on an enlarged scale showing the device inverted, and Fig. 3 is a front elevation of the device.

In carrying the invention into effect, I employ an oblong body plate 10. This plate is preferably formed from a piece of suitable resilient sheet metal and is curved transversely. Suitably connected to the lower side of the plate at one end thereof is a pad 11 and depending from the plate medially thereof in the rear of this pad are longitudinally spaced supporting brackets 12. These brackets are formed of upper and lower sections adjustably connected by clamping bolts 13, the upper sections being provided with spaced lugs slidably receiving the lower sections while the lower sections are slotted to receive said bolts. Formed on the upper sections are terminal lugs 14 through which are engaged bolts or other suitable fastening devices rigidly connecting the brackets with the plate 10. At their lower ends the lower sections are provided with terminal lugs 15 which carry suitable pads.

It may be here noted that the terms "upper," "under" and "lower", or their equivalents used in this description are employed with reference to the relative position of the parts as they are arranged in actual use, as shown in Fig. 1.

Depending from the lower side of the plate 10 in a plane at one side of the brackets 12 is a pair of longitudinally spaced attaching arms 16. These arms, like the brackets 12, are also formed of sections adjustably connected by clamping bolts 17, one of the sections being slotted to receive said bolts and being provided with spaced lugs slidably engaging the other section. The upper sections are provided with terminal lugs 18 adjustably connected to the plate 10 by suitable bolts received through slots in the lugs. The lower sections are provided with terminal inwardly directed lugs 19.

Depending from the plate 10 in a plane at the side of the brackets 12 opposite to the arms 16, is a second pair of longitudinally spaced attaching arms 20 adapted to coact with the first pair and arranged opposite thereto. The arms 20, like the arms 16, are also formed of sections adjustably connected by clamping bolts 21, the lower sections being provided with spaced lugs slidably engaging the upper sections and being slotted to receive said bolts. Swingingly supporting the arms are angle plates 22 adjustably secured to the plate 10 by bolts extending through suitable slots in the plates. Suitable hinge connections are provided between the upper sections of the arms and said plates. Riveted or otherwise secured to the angle plates 22 are bowed springs 23 bearing against the free end portions of the arms and adapted to yieldably resist spreading of the arms away from the arms 16. Formed on the free ends of the lower sections of the arms are inwardly directed lateral lugs 24 corresponding to the lugs 19 of the arms 16 and these lugs 24 are provided with depending lips 25. Pressed from the plate 10 are ribs 26 against which the lugs at the inner ends of the arms and brackets are abutted to prevent turning thereof.

In order that the manner in which my improved mud guard is employed may be readily understood, I have, in Fig. 1 of the drawings, shown the device in connection with one rear wheel 27 of a conventional type of wagon 28. To connect the device with the axle, the arms 20 are first swung away from the arms 16 so that the axle may be received between the pairs of arms when the arms are shifted downwardly over the axle to engage the lugs 15 of the brackets 12 against the upper side of the axle or, as shown in Fig. 1, against the axle sill. These brackets will then sustain the plate 10 projecting at its outer end over the inner end of the wheel hub so that the pad 11 will thus confront the hub to provide a close joint between the guard plate and the hub. Upon the release of the arms 20 these arms will then be moved by the springs 23 to engage the axle which will thus serve to hold said arms spaced away from the arms 16 so that the axle will be consequently clamped between the pairs of arms while the lugs 19 and 24 of the arms will engage beneath the axle for thus firmly connecting the device therewith. However, as will be clear, the device may be readily detached by simply grasping the lips 25 of the arms 20 and swinging these arms outwardly to disengage the axle.

Attention is now directed to the fact that the lower sections of the brackets 12 may be adjusted for elevating or lowering the guard plate 10 with respect to the axle and accordingly, with respect to the wheel hub so that as the pad 11 wears away such wear may be readily taken up. Furthermore, this adjustment provides a means whereby the length of the brackets 12 may be varied to suit the conditions of different wagons. Also, the length of the arms 16, as well as the length of the arms 20 may be similarly varied to meet the conditions of different wagons so that the lugs at the lower ends of the arms may tightly engage beneath the wagon axle. Further, the pairs of arms 16 and 20 may be adjusted transversely of the guard plate to accommodate different sized axles therebetween. I, therefore, provide a device which is well adapted for general use while, at the same time, the device is, as will be appreciated, of particularly simple construction and may be applied with a minimum of difficulty.

Having thus described the invention, what is claimed as new is:

1. A device of the class described including a body plate having a hub engaging pad at one end portion, a pair of extensible brackets depending from the under side of said body plate and being adjustable vertically with respect to the plate for taking up the wear on said hub engaging pad, a pair of arms depending from the under side of said brackets at one side of said brackets and comprising pairs of longitudinally adjustable sections, a pair of angle plates secured to the under side of said body plate and adjustable transversely of the same, a second pair of arms hinged to said angle plates and comprising upper and lower sections adjustable with relation to each other, and bowed springs rigidly connected at their upper ends to said angle plates and engaging the lower sections of said second named pairs of arms for urging the same inwardly, the lower portions of said first and second named arms being provided with inwardly extending lugs adapted for engaging an axle.

2. A device of the class described comprising a plate having a hub pad, a pair of extensible supporting brackets depending from the under side of said plate inwardly of the side edges of the same, a pair of axle engaging arms depending from said plate at one side of said brackets, a second pair of an axle engaging arms hingedly connected to said plate at the other side of said brackets, and leaf springs engaging the free end portions of said hinged arms and urging the same inwardly, the end portions of said first and second named pairs of arms being directed inwardly for engaging an axle, said hinged arms and said spring being adjustable transversely of the pad.

In testimony whereof I affix my signature.

RALPH HASTINGS. [L. S.]